Sept. 23, 1958

C. T. WALLIS 2,852,799

WINDSHIELD WIPER SHAFT ASSEMBLY
FOR WIPING CURVED WINDSHIELDS

Filed Aug. 26, 1953

INVENTOR.
CYRIL T. WALLIS
BY
George H. Strickland
HIS ATTORNEY

Sept. 23, 1958

C. T. WALLIS 2,852,799

WINDSHIELD WIPER SHAFT ASSEMBLY
FOR WIPING CURVED WINDSHIELDS

Filed Aug. 26, 1953

INVENTOR.
CYRIL T. WALLIS
BY
George H. Strickland
HIS ATTORNEY

United States Patent Office 2,852,799
Patented Sept. 23, 1958

2,852,799

WINDSHIELD WIPER SHAFT ASSEMBLY FOR WIPING CURVED WINDSHIELDS

Cyril T. Wallis, Brockport, N. Y., assignor to General Motors Corporation, Detroit, Mich., a corporation of Delaware Application August 26, 1953, Serial No. 376,647

7 Claims. (Cl. 15—253)

This invention pertains to a windshield wiper shaft assembly, and more particularly to a shaft assembly for imparting compond movement to a wiping element.

Recent trends in motor vehicle body design indicate that in the near future, windshields will extend or "wrap around" the sides of the motor vehicle. With this type of compound curved windshield, i. e. a curved transparency in which the side portions are disposed in substantially parallel planes, adequate cleaning thereof cannot be accomplished by either straight, rigid wiping blades or flexible wiping blades of the type shown in United States Patent 2,596,063, Anderson, inasmuch as the wiping element, or blade, must clean surfaces which are located at substantially right angles to each other. A typical example of this type of windshield is now used on the 1953 Cadillac Eldarado. Accordingly, among my objects are the provision of means for imparting compound movement to a wiping element; the further provision of means for rocking a wiping element so as to follow the curvature of a transparency; and the still further provision of a wiper shaft assembly constructed and arranged to impart rocking movement to a blade upon oscillation thereof.

The aforementioned and other objects are accomplished in the present invention by employing a shaft assembly having a rocker arm, or lever, pivotally attached thereto for imparting a "rocking" motion to a wiping element during its oscillatory movement. Specifically, the cleaner comprises a wiper blade supported by a wiper arm, which is attached to one end of a rocker arm. The rocker arm is pivotally mounted to a wiper shaft and is disposed in a slot therein. Inasmuch as the wiper shaft is rotatably supported within a bearing assembly, and is adapted for connection with any suitable oscillating mechanism, the rocker arm and, hence, the wiper blade will oscillate with the wiper shaft.

In order to impart compound motion to the wiping element, or blade, that is, motion with the oscillating shaft and motion in a plane at right angles to the plane or oscillatory movement, the present invention contemplates the use of a cam member for imparting rocking movement to the wiping element. The cam member is contoured to suit the particular exigencies in use, which in the embodiment disclosed is in conjunction with a transparency having front and side portions disposed in planes substantially 90° apart. However, this embodiment is only by way of example and is not to be construed as a limitation, as the contour of the cam determines the amount of rocking movement imparted to the wiping element in a plane normal to the plane of oscillatory movement. Thus, it is apparent that the cam contour may be designed to suit the particular curvature of any particular transparency. The cam is disposed within the stationary bearing assembly, and one end of the rocker arm is maintained in engagement therewith through a thrust ball bearing by means of a leaf spring.

In a motor vehicle installation, four wiping elements are employed, two for each side of the windshield, which elements are operated in tandem. Each pair of elements, or blades, are actuated by an independent driving mechanism, and synchronizing means are provided between the two driving mechanisms, as is more particularly disclosed in copending application, Serial No. 377,436, filed on August 31, 1953, in the name of John B. Dyer, et al. Two blades are employed to wipe the front portion of the transparency and two blades are employed to wipe sections of both the front and side portions. The latter blades employ the wiper arm assembly of this invention, while the former blades are actuated in a conventional manner. The rocking, or auxiliary wiping, blades are mounted so that their pivotal connection is substantially midway between the front and side portions of the vehicular transparency. In other words, the auxiliary blades are located at a point which substantially bisects the angle between the front and side portions of the windshield.

Further objects and advantages of the present invention will be apparent from the following description, reference being had to the accompanying drawings wherein a preferred embodiment of the present invention is clearly shown, and wherein similar reference characters denote similar parts throughout the several views.

Figure 2:
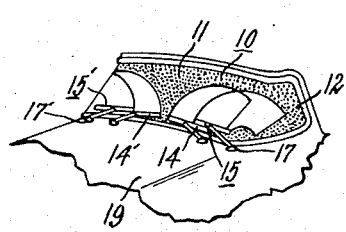
Fig. 2 is a fragmentary view, in perspective, of a motor vehicle equipped with four wiper blades for cleaning a windshield having front and side portions.
Figure 4:
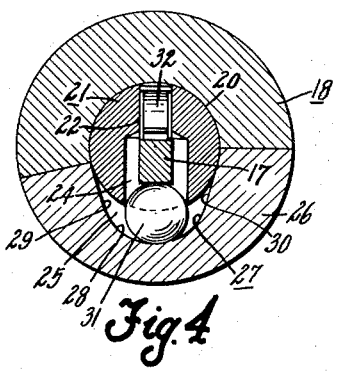
Fig. 4 is a sectional view taken along line 4—4 of Fig. 3.
Figure 3:
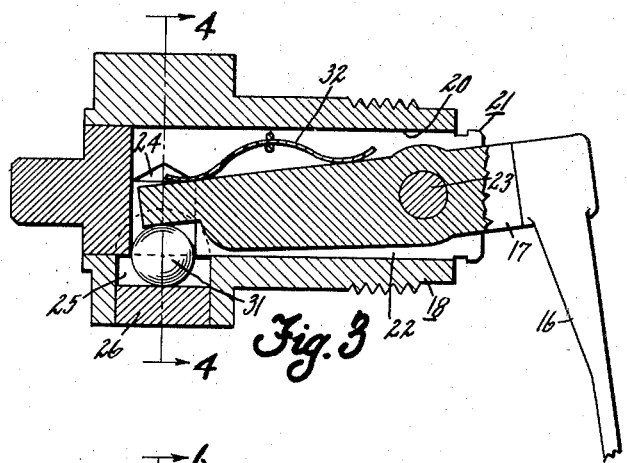
Fig. 3 is a sectional view of the wiper shaft assembly of this invention with the rocker arm in one of its limit positions.
Figure 6:
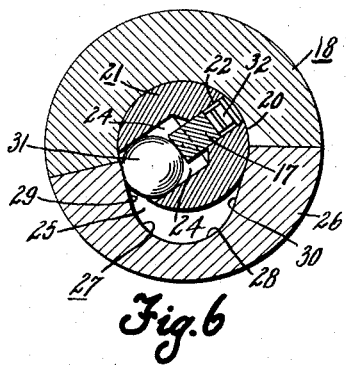
Fig. 6 is a sectional view taken along line 6—6 of Fig. 5.
Figure 5:
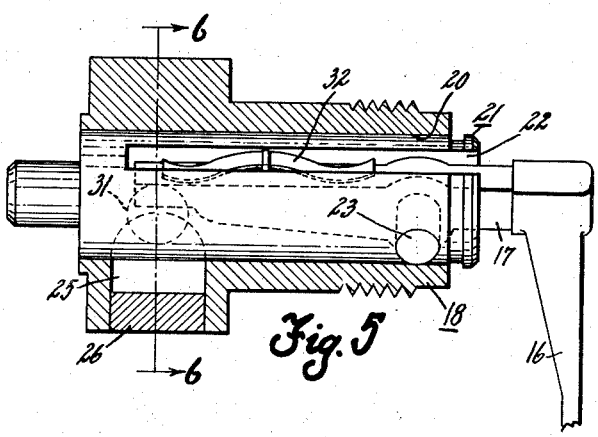
Fig. 5 is a sectional view of the wiper shaft assembly of this invention with the rocker arm in the other of its limit positions.

With particular reference to Fig. 2, it may be seen that the vehicle transparency, or windshield, 10 includes a front portion 11 and "wrap around" side portions, only one, 12, of which is shown in Fig. 2. The configuration of the windshield surface is such that the side portions thereof are disposed in substantially parallel planes, that are located substantially 90° from the plane of the front portion 11. It will be appreciated that from the nature of the compound curved surface, a single wiping element, or blade, of conventional design, could not be used to clean a sufficient portion of the winshield. Accordingly, the present invention contemplates a cleaner comprising a conventionally mounted main blade 14 and an auxiliary blade 15 mounted in the wiper shaft assembly of this invention, which blades are operated in tandem on each side of the windshield so as to clean sections of the front and side portions. The wiper blades on the other side of the windshield, as well as other parts of the vehicle are denoted by similar numerals with primes affixed.

Figure 1:
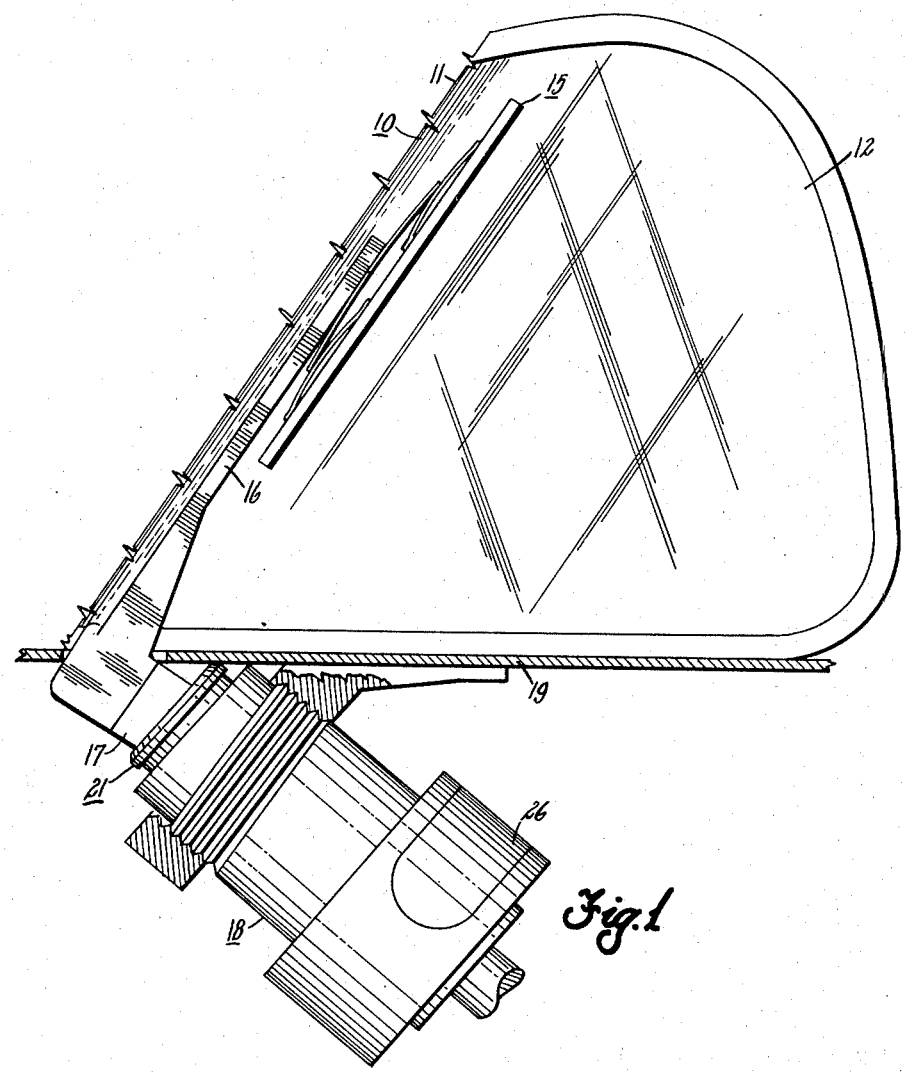
Fig. 1 is a fragmentary view, partly in elevation and partly in section, of a motor vehicle equipped with the wiper shaft assembly of this invention.

Referring more particularly to Fig. 1, the wiping element 15 may be of the type shown in the Anderson patent, previously referred to. Thus, the wiping element includes a flexible blade portion composed of suitable resilient material, such as rubber, having attached thereto a pair of yokes, or links, which are pivotally joined at their midpoints by a third link, the midpoint of which is detachably connected to a wiper arm 16. The wiper arm 16 is connected to one end of a rocker arm, or lever, 17, which forms a component part of the wiper shaft assembly of this invention. As is shown in Fig. 1, the wiper shaft assembly includes a bearing support member 18, which is rigidly attached to the cowl portion 19 of the motor vehicle. Moreover, from an inspection of the diagrammatic view of Fig. 2, it may be seen that the rocker arm 17, or element, projects through the cowl 19 at a point substantially midway between the front and side portions of the windshield 10.

Figure 7:
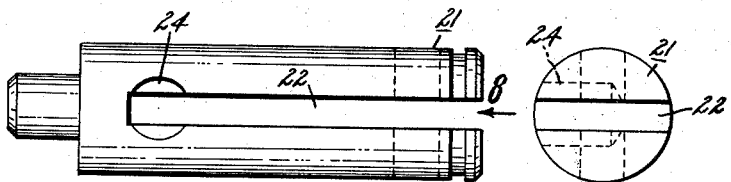
Fig. 7 is a view, in elevation, of the oscillatable shaft.
Figure 8:
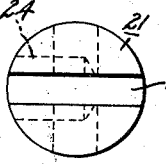
Fig. 8 is a view taken in the direction of arrow 8 of Fig. 7.

Referring to Figures 3 through 8, the construction of the wiper shaft assembly will next be described. As previously alluded to, the wiper shaft assembly includes a stationary bearing member 18 having a through bore 20 within which an oscillatable shaft 21 is rotatably supported. The shaft 21 is adapted for connection to any suitable oscillating mechanism, which may be of the type disclosed in copending application, Serial No. 347,021, filed April 6, 1953, in the name of John B. Dyer, et al. As is shown in Figures 7 and 8, the shaft 21 is formed with a longitudinal, diametrical slot 22 within which the rocker arm 17 is pivotally mounted by means of a cross pin 23. The shaft 21 is further provided with a radially extending opening 24, which intersects the slot 22 for a reason which will appear more fully hereinafter.

The bearing member 18 is further provided with an arcuate, radially extending slot 25 within which an arcuate cam member 26 is retained by any suitable means. The cam member 26 has a contoured surface 27, one portion 28 of which is concentric with the shaft 21 and other portions 29 and 30, which extend substantially tangentially to the shaft 21. The radially extending opening 24 in the shaft 21 receives a thrust ball bearing 31, which constitutes a cam follower. One end of the rocker arm 17 is maintained in engagement with the ball 31 by means of a leaf spring 32, which is supported within the slot 22 of the shaft 21 between a pair of cross pins. Inasmuch as the contour of the cam 26 is of varying radial distance from the axis of rotation of shaft 21, it wil be appreciated that during oscillatory movement of the shaft 21, the rocker arm 17 and, hence, the wiper blade 15 will be rocked about the cross pin 23, which movement is in a plane normal to the plane of oscillation.

Figure 9:
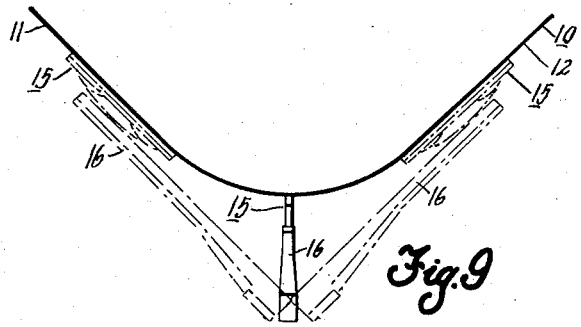
Fig. 9 is a diagrammatic view illustrating the compound movement imparted to the wiping element by the apparatus of this invention.

With reference to Figures 3 through 9, the mode of operation of the rocking wiper blade 15 will be described. With the wiper blade 15 in the full line position of Fig. 9, the shaft 21 and the rocker arm 17 are in the position shown in Figs. 3 and 4. In this position, is should be noted that the wiper blade 15 is positioned substantially normal to the midpoint of the windshield 10 between the front and side portions thereof. Accordingly, as the shaft 21 is rotated in a clockwise direction, as viewed in Fig. 4, to the position of Fig. 6, the rocker arm 17 will, likewise, be moved in a clockwise direction, and in so moving, the ball 31 will engage portion 29 of the cam surface so as to rock the wiper arm 16 and blade 15 towards the front portion of the windshield 10. Accordingly, the blade 15 will be moved to the dotted line position on the front portion 11 of the windshield, as shown in Fig. 9, from which it may be seen that the blade 15 is still substantially normal to the windshield 10. Conversely, when the shaft 21 is rotated in a counterclockwise direction from the position of Fig. 4, the ball 31 will engage portion 30 of the cam surface so as to rock the arm 17 and the wiper blade 15 towards the side portion 12 of the windshield, as indicated in dotted lines in Fig. 9. From an inspection of Figure 9, it may be seen that the plane of action of the wiper blade 15 continuously changes during oscillation of the shaft 17 between its end positions by reason of the rocking movement of the lever 17. In the instant embodiment, the wiper blade 15 will be positioned in planes substantially 90° apart at the end positions of the shaft 21. However, it is apparent that the cam contour may be modified so as to position the blade 15 in planes which are separated by either an acute or an obtuse angle.

From the foregoing, it is manifest that the present invention provides means for imparting compound motion to a wiping element, so as to change the plane of action of the wiping element during its oscillatory movement. Moreover, by "rocking" the wiper blade during its oscillatory movement, the wiper blade may be employed to wipe surfaces having portions located in different planes. In addition, the present invention provides means for enabling the cleaning of any compound curved vehicular transparency without resort to specially designed wiping blades.

While the embodiment of the present invention as herein disclosed, constitutes a preferred form, it is to be understood that other forms might be adopted.

What is claimed is as follows:

1. In combination, an oscillatable shaft having a diametrically slotted portion, a wiping element, means interconnecting the wiping element and the shaft including a member pivotally mounted between its ends within said shaft slot, and cam means engageable with one end of said member for effecting movement thereof about an axis normal to the axis of said shaft during oscillation of said shaft.

2. In combination, an oscillatable shaft having a diametrical slot therein, a bearing member supporting said shaft for oscillation and having a cam surface, a wiping element, and means interconnecting the shaft and the wiping element including an arm pivotally connected between its ends to said shaft within said slot, one end of said arm having operative engagement with said cam surface for imparting a rocking movement to said wiping element during oscillation of said shaft.

3. In combination, a bearing member having a through bore, an oscillatable shaft rotatably journaled within the through bore of said member, said shaft having a diametrical slot therein, said bearing member having an arcuate slot communicating with said through bore, a cam member situated in said arcuate slot of said bearing member, a wiping element, and means interconnecting the shaft and the wiping element including an arm pivotally connected to said shaft within said slot, one end of said arm having operative engagement with said cam for imparting rocking movement to said wiping element during oscillatory movement of said shaft.

4. A wiper shaft assembly comprising, a stationary bearing member having a through bore, an oscillatable shaft rotatably supported within the through bore of said member and having a diametrical slot, a lever pivotally supported within the slot of said shaft and oscillatable therewith, and means including a cam carried by said bearing member having operative engagement with one end of said lever for imparting rocking movement thereto upon oscillation of said shaft.

5. A wiper shaft assembly comprising, a bearing member having a through bore, an oscillatable shaft rotatably journaled within the through bore of said member and having a slot therein, said member having a radially extending arcuate opening, a cam member disposed in said arcuate opening, and a lever disposed in the slot of said shaft and pivotally connected thereto for rocking movement about an axis normal to the axis of said shaft, one end of said lever having operative engagement with said cam whereby oscillation of said shaft will impart rocking movement to said lever.

6. The combination set forth in claim 5 wherein the shaft includes a radial opening in alignment with the arcuate opening of said member, and a ball bearing is disposed in said radial opening and engageable with the cam and said end of the lever for imparting rocking movement thereto upon oscillation of said shaft.

7. The combination set forth in claim 6 wherein the said one end of the lever is maintained in engagement with said ball bearing by resilient means disposed within the slot of said shaft.

References Cited in the file of this patent

UNITED STATES PATENTS

| | | |
|---|---|---|
| 2,356,424 | Paton | Aug. 22, 1944 |
| 2,412,319 | Carey | Dec. 10, 1946 |
| 2,533,963 | Sacchini | Dec. 12, 1950 |
| 2,691,186 | Oishei | Oct. 12, 1954 |